United States Patent [19]

Basile et al.

[11] 4,169,802

[45] Oct. 2, 1979

[54] STABILIZED FERROMAGNETIC CHROMIUM DIOXIDE AND PROCESS FOR ITS PREPARATION

[75] Inventors: Giampiero Basile; Elio Gallinotti, both of Alessandria; Giancarlo Boero, Asti, all of Italy

[73] Assignee: Montedison S.p.A., Milan, Italy

[21] Appl. No.: 893,348

[22] Filed: Apr. 4, 1978

[30] Foreign Application Priority Data

Apr. 7, 1977 [IT] Italy .................. 22224 A/77
Feb. 22, 1978 [IT] Italy .................. 20508 A/78

[51] Int. Cl.$^2$ ............................................ C01G 37/02
[52] U.S. Cl. ........................... 252/62.51; 423/274; 423/607; 427/127; 427/215; 428/404; 428/539; 428/900
[58] Field of Search ............... 423/607, 274; 252/62.51; 427/127, 215; 428/404, 539, 900

[56] References Cited

U.S. PATENT DOCUMENTS

| | | | |
|---|---|---|---|
| 3,686,031 | 8/1972 | Balthis | 252/62.51 |
| 3,811,942 | 5/1974 | Rennolds | 252/62.51 |
| 3,841,907 | 10/1974 | Leutner et al. | 252/62.51 |
| 4,068,038 | 1/1978 | Montiglio et al. | 423/607 |

FOREIGN PATENT DOCUMENTS 2249273 4/1974 Fed. Rep. of Germany .......... 423/607

*Primary Examiner*—Herbert T. Carter
*Attorney, Agent, or Firm*—Morgan, Finnegan, Pine, Foley & Lee

[57] ABSTRACT

The present invention concerns a stabilized ferromagnetic chromium dioxide and a process for obtaining the same. More particularly, the present invention relates to ferromagnetic chromium dioxide stabilized by means of the coating of its particles with a stabilizing substance, characterized in that the stabilizing substance is selected from the group consisting of a zinc, aluminum or chromium (III) polyphosphates having a high molar ratio phosphorus/metal and having, depending on the metal, the following formula: $P_2O_5.nZnO.mH_2O$ wherein "n" in general is comprised between 0.286 and 0.667 while "m" is generally comprised between 0 and 2.570;

$P_2O_5.nAl_2O_3.mH_2O$ wherein "n" is in general comprised between 0.225 and 0.500, while "m" is generally comprised between 0 and 2.68;

$P_2O_5.nCr_2O_3.mH_2O$ wherein "n" is in general comprised between 0.143 and 0.333, while "m" is generally comprised between 0.002 and 2.46.

14 Claims, No Drawings

4,169,802

STABILIZED FERROMAGNETIC CHROMIUM DIOXIDE AND PROCESS FOR ITS PREPARATION

BACKGROUND OF THE INVENTION

Chromium dioxide is a material of high magnetic characteristics which finds its prevailing application in the field of magnetic tape recording. It shows a certain chemical reactivity towards water and certain organic substances, particularly towards those containing easily oxidizable functional groups such as for instance hydroxyl or aminic groups. Said functional groups are often present in the resins used in the formulations for magnetic recording tapes, wherefore the $CrO_2$ particles incorporated in the tape may oxidate said functional groups, reducing themselves, at least superficially, to chromium compounds of a lower valency, such as CrOOH, which are not ferromagnetic and in consequence whereof the residual magnetization of the magnetic tape may drop with time, resulting in a reduction of the output level of the tape on which a recording has been made.

It is known to stabilize the $CrO_2$ subjecting the surface of its particles to a reducing treatment, by making it react, for instance, with $H_2S$ or with alkaline bisulphites. Said treatment has however the drawback of consuming, through the reduction reaction, a considerable quantity of treated $CrO_2$ (up to about 30%).

It has also been suggested to stabilize the $CrO_2$ by coating its particles with various water-insoluble substances, as for instance $SiO_2$ or $Al_2O_3$. However, no appreciable stabilizing effect could be obtained with such coatings: while the $CrO_2$ particles, dispersed in water after the treatment, showed a considerable reduction of their reactivity with water, no appreciable improvement could be detected when the stability of the $CrO_2$ was evaluated in the tapes themselves.

OBJECTS OF THE INVENTION

An object of this invention is to provide a chromium dioxide that will display a high chemical stability towards water and the oxidizable organic substances, and consequently will display a high chemical stability in the magnetic tapes in which it is used.

Still another object of this invention is that of obtaining improved stability by means of a simple coating, thus avoiding to the consumption of part of the $CrO_2$ during the treatment for the stabilization.

A further object of the invention is that or providing a process for obtaining said stabilized $CrO_2$.

SUMMARY OF THE INVENTION

The invention concerns a stabilized chromium dioxide and a process for its preparation. The stabilized product consists of a $CrO_2$ whose particles are coated with a Zn, Al or Cr polyphosphate of the formula $P_2O_5.nZnO.mH_2O$, $P_2O_5.nAl_2O_3.mH_2O$ or $P_2O_5.nCr_2O_3.mH_2O$.

The values of "n" and "m" in general are comprised between the following values: for Zn from 0.286 to 0.667 and from 0 to 2.570; for Al from 0.225 to 0.500 and from 0 to 2.68 and for Cr from 0.143 to 0.333 and from 0.002 to 2.46 respectively.

The process consists in coating the $CrO_2$ particles with Zn, Al or Cr orthophosphate or hydroxide, in then treating it with $H_3PO_4$ and successively in subjecting it to a heat treatment.

GENERAL DESCRIPTION OF THE INVENTION

All the objects of this invention, as well as still other ones, are achieved by providing a ferromagnetic chromium dioxide stabilized by a coating on its particles of a stabilizing substance which, according to this invention, is a zinc polyphosphate, an aluminum polyphosphate or a chromium (III) polyphosphate having a high phosphorus/metal molar ratio and having, depending on the metal, the following formula:

$P_2O_5.nZnO.mH_2O$ wherein "n" in general is comprised between 0.286 and 0.667, and where "m" in general is comprised between 0 and 2.570 or $P_2O_5.nAl_2O_3.mH_2O$ wherein "n" in general is comprised between 0.225 and 0.500 while "m" in general is comprised between 0 and 2.68, or $P_2O_5.nCr_2O_3.mH_2O$ wherein "n" in general is comprised between 0.143 and 0.333 while "m" in general is comprised between 0.002 and 2.46.

The molar phosphorus/metal ratio is said polyphosphates in general is thus comprised between 3 and 7 in the case of zinc, between 2 and 4.5 in the case of aluminum and between 3 and 7 in the case of chromium. These polyphosphates with a high phosphorus/metal molar ratio are polymeric substances by themselves known and have been described, for instance, on page 494 and following of the treatise by H. J. Meleus and J. S. Anderson: "Moderni aspetti della chimica inorganica," Edizioni Feltrinelli, Milano 1965 (translation from the original text "Modern aspects of inorganic chemistry", edited by Routledge and Kegan Paul Ltd., 1960).

The polyphosphates according to this invention prove to be amorphous under X-ray diffractometric analysis. The zinc polyphosphates that are preferred, in general have a value of 'n' comprises between 0.286 and 0.500 (corresponding to a P/Zn molar ratio comprised between 4 and 7) and a value of 'm' comprised between 0.005 and 0.865. Particularly preferred zinc polyphosphates are those having a value of 'n' comprised between 0.333 and 0.500 (corresponding to a molar ratio P/Zn comprised between 4 and 6) and a value of 'm' comprised between 0.005 and 0.735. The zinc polyphosphates according to the present invention have a refraction index $n_D$ at 25° C. generally comprised between 1.450 and 1.520.

The preferred aluminum polyphosphates in general have a value of 'n' comprised between 0.250 and 0.333 (corresponding to a molar ratio P/Al comprised between 3 and 4) while the value of 'm' is comprised between 0 and 1.45.

The preferred chromium polyphosphates in general have a value of 'n' comprised between 0.200 and 0.250 (corresponding to a molar ratio P/Cr comprised between 4 and 5) while the value of 'm' is comprised between 0.53 and 1.16.

The preferred polyphosphates are the zinc and aluminum polyphosphates.

The quantity of metal polyphosphate coating in general is comprised between 1% and 25% by weight referred to the $CrO_2$. In the case of zinc polyphosphate, the preferred quantity in general is comprised between 8% and 16%, while the values comprised between 8 and 12% usually are particularly preferred.

In the case of aluminium polyphosphate, the preferred quantity in general is comprised between 4% and 16% while in the case of chromium polyphosphate the preferred quantity in general is comprised between 3 and 14%.

The $CrO_2$ stabilized with zinc, aluminum or chromium polyphosphate, according to this invention may be obtained by means of a process in which in a first stage the $CrO_2$ is dispersed in water and on it is then precipitated Zn-, Al- or Cr-orthophosphate or hydroxide. The $CrO_2$, coated with the orthophosphate or hydroxide, is then separated from the water and treated in a second stage with $H_3PO_4$ taken in such a quantity that the molar ratio between the ZnO introduced into the first stage and the $P_2O_5$ introduced into both stages in general be comprised between 0.286 and 0.667 or that the corresponding ratio $Al_2O_3/P_2O_5$ in general be comprised between 0.225 and 0.500 or that the corresponding ratio $Cr_2O_3/P_2O_5$ in general be comprised between 0.143 and 0.333.

In a third stage the intermediate product thus obtained is treated at temperatures comprised between 100° and 350° C. when starting from zinc orthophosphate or hydroxide, and comprised between 275° and 350° C. when starting from Al or Cr orthophosphate or hydroxide. In the case of zinc polyphosphate, there is preferably used a temperature comprised between 180° C. and 350° C., while the temperature most preferred are those comprised between 300° and 350° C. In the case of Al- or Cr- polyphosphate, the preferred temperature is comprised between 300° and 350° C. The use of temperatures comprised between 300° and 350° C. improves the mechanical resistance of the coating which supports better the grinding operation to which the $CrO_2$ powder is subjected during the fabrication of the tape, thus ensuring a greater stability of the powder in the tape.

Any type of ferromagnetic chromium dioxide may be used as starting $CrO_2$. One may use $CrO_2$ free of modifiers, as well as a $CrO_2$ modified with any modifying element of $CrO_2$, such as for instance: Sb, Te, Fe, La and Ru, or with any combination of modifying elements, as for instance Sb+Fe; Sb+Te; La+Fe; Te+Fe; Sb+Te+Fe, etc.

The chromium dioxide modified with a modifying element or combination of modifying elements, is described in numerous patents such as for instance in the following U.S. Pat. Nos. 2,885,365, 2,923,683, 2,923,684, 3,034,988, 3,068,176, 3,371,043, 3,640,871, 3,687,851 and 3,874,923.

The greatest benefit is obviously obtained when the starting $CrO_2$ has characteristics suitable for its use in magnetic recording tapes, that is, when it has a coercive force of at least 450 Oersted and a residual magnetization of at least 1500 Gauss, a mean length of the particles not exceeding $0.5\mu$ and an axial ratio (length/width) of the particles of around 10.

The best stability in general is attained when one properly disaggregates the starting $CrO_2$ particles, so as to bring the mean size of the agglomerates below the value of $50\mu$ and preferably to a value not exceeding $10\mu$.

This state of disaggregation of the particles may be obtained by either dry or wet grinding. Particularly convenient appears to be the wet grinding, for instance, in a rotating jar containing suitable grinding material, for instance steatite balls, or in a microball mill with microballs made, for instance, of stainless steel. The wet grinding in general is carried out in water with a $CrO_2$ concentration comprised between 100 and 500 g/lt. of slurry, but preferably at concentrations comprised between 250 and 350 g/lt.

The first stage of the treatment in general is effected with a concentration of from 50 to 300 g of $CrO_2$ per liter of slurry. The precipitation of the Zn, Al or Cr orthophosphate may be achieved by reacting a hydrosoluble salt of the metal with an alkaline orthophosphate. As soluble salts, there may be used, for instance, zinc sulphate, zinc chloride or zinc nitrate; aluminum sulphate, chloride or nitrate and Cr(III) chloride, nitrate or acetate. As alkaline orthophosphates there may be used, for instance, $NaH_2PO_4$, $Na_2HPO_4$, $KH_2PO_4$ and $K_2HPO_4$. To the reaction medium is added an alkaline hydroxide (for instance NaOH) or ammonia so as to bring the pH to the best values suited for the precipitation of the desired phosphate, that is to values comprised between 5 and 7 for zinc orthophosphate, between 7.5 and 8.5 per aluminum orthophosphate and between 7 and 8 for the chromium orthophosphate.

The alkaline orthophosphate and the metal salt are added separately or contemporaneously, while the alkaline hydroxide or the ammonia are usually added at the last. When the alkaline phosphate and the metal salt are added separately, one of these two reactants may be introduced into the wet grinding stage.

The ratio between metal ions and $PO_4$ in general is stoichiometric. However, it is also possible to use the metal salt in excess; in such a case, together with the orthophosphate, there also pecipitates hydroxide. The reaction in general is carried out at room temperature.

Other methods for producing the precipitation of the metal orthophosphate on the $CrO_2$ particles may be used; thus, for instance, there may be precipitated Cr(III) orthophosphate in the following way: $CrO_3$ (dissolved in an aqueous $CrO_2$ dispersion) is reduced to Cr(III) by means of a reducing compound such as for instance $SO_2$, $NaHSO_3$ or $Na_2S_2O_5$ in the presence of $H_3PO_4$.

The slurry thus obtained at the end of the first stage, and consisting of $CrO_2$ coated with metal phosphate, is separated from the water, for instance by filtering, and the product is then washed with water in order to remove the soluble salts that have formed during the reaction of the metal salt with the alkaline phosphate.

It is convenient to eliminate a large part of the inbibition water of the cake until obtaining a cake containing for instance from 40% to 60% of water; this may be achieved for instance by suction under vacuum or in a filter press. To the cake is then added phosphoric acid taken in such quantities as to meet the metal oxide to $P_2O_5$ molar ratios defined previously. For this purpose it is preferable to use an aqueous solution of $H_3PO_4$.

The cake that has been admixed with phosphoric acid is then vigorously stirred, for instance for 10-60 minutes. The second stage is usually conducted at room temperature. The first and, above all, the second stage are carried out under vigorous stirring so as to ensure a uniform distribution, especially in the second stage, of the reactants in the mass of the chromium dioxide. Next the cake is heated up in the third stage to the temperatures defined previously. The duration of the heating in general is such as to ensure that the product remains at the temperature chosen for a period of time exceeding 2 hours, but preferably for a period comprised between 5 hours and 10 hours. The heating may be conducted, for instance, in a current of hot air or in a rotating oven. During the thermal treatment, on the $CrO_2$ particles there forms the polyphosphate coat. The value of "m"

decreases with the rising of the treatment temperature; at equal temperature, the decrease of "m" is greater for the products that have a high value of "n".

The preferred zinc polyphosphates wherein "n" is comprised between 0.286 and 0.500 and "m" is comprised between 0.005 and 0.865, are obtained by using a molar ratio between the ZnO instroduced into the first stage and the $P_2O_5$ introduced into the first and the second stages, comprised between 0.286 and 0.500 and by then treating the intermediate product at temperatures comprised between 300° and 350° C. The zinc polyphosphates that are the most preferred, in which "n" is comprised between 0.333 and 0.500 and "m" is comprised between 0.005 and 0.735, are obtained with a molar ratio $ZnO/P_2O_5$ comprised between 0.333 and 0.500 and by treating the intermediate product at temperatures comprised between 300° and 350° C.

The preferred aluminum polyphosphates, in which "n" is comprised between 0.250 and 0.333 and "m" is comprised between 0 and 1.45, are obtained by using a molar ratio between the $Al_2O_3$ introduced into the first stage and the $P_2O_5$ introduced into the first and the second stages, comprised between 0.250 and 0.333 and by then treating the intermediate product at temperatures comprised between 300° and 350° C.

The preferred chromium polyphosphates, in which "n" is comprised between 0.200 and 0.250 and "m" is comprised between 0.53 and 1.16, are obtained by using a molar ratio between $Cr_2O_3$ introduced into the first stage and the $P_2O_5$ introduced into the first and second stages, comprised between 0.200 and 0.250 and by treating the intermediate product at temperatures comprised between 300° and 350° C.

The quantities of zinc, aluminum or chromium compounds and of $H_3PO_4$ with reference to the $CrO_2$, are obviously calculated as a function of the quantity of coating desired. Thus, for instance, in order to obtain a coating consisting of from 1 to 25% by weight of $P_2O_5$.$nZnO.mH_2O$ (wherein "n" is comprised between 0.286 and 0.667 and "m" is comprised between 0 and 2.570) with reference to the $CrO_2$, in the first stage there is used from 0.11 to 6.94% by weight of soluble zinc salt, calculated as ZnO, with respect to the starting $CrO_2$, and globally in the first and second stages there is used from 0.67% to 18.06% by weight of alkaline phosphate and $H_3PO_4$, calculated as $P_2O_5$, with respect to the starting $CrO_2$.

The chromium dioxide coated with the metal polyphosphate is then dry ground, for instance, in an impact stud mill with counterrotation stud disks until reducing it to a particle size below 50μ, and preferably not greater than 10μ.

As already explained, in the first stage, instead of the metal orthophosphates there may be precipitated the metal hydroxides. The precipitation of $Zn(OH)_2$, $Al(OH)_3$ or $Cr(OH)_3$ in general is achieved by reaction, in the aqueous $CrO_2$ suspension, of a soluble zinc salt, aluminum salt or of chromium salt, for instance one of those defined previously with an alkaline hydroxide (e.g. NaOH) or ammonia.

The metal salt is introduced first, while the alkaline hydroxide or the ammonia is added successively, in such quantities as to bring the pH to the values that are best for the precipitation of the hydroxide, that is, to values comprised between 5 and 7 in the case of $Zn(OH)_2$, between 8 and 9 for $Al(OH)_3$ and between 6 and 7 for $Cr(OH)_3$.

The preliminary disaggregation of the $CrO_2$ and the other details of this first stage are identical with those of the process in which metal orthophosphate is precipitated. The other two stages are completely identical except, of course, for the quantity of $H_3PO_4$ added in the second stage which is greater so as to meet the above specified molar ratios between the metal oxide and the $P_2O_5$. Thus, for instance, in order to obtain a coating consisting of from 1% to 25% by weight, referred to the $CrO_2$, of $P_2O_5.nZnO.mH_2O$ (in which "n" is comprised between 0.286 and 0.667 and "m" is comprised between 0 and 2.570), in the first stage there is used from 0.11 to 6.94% by weight of a soluble salt of Zn, calculated as ZnO, with respect to the starting $CrO_2$, while in the second stage there is used from 0.67% to 18.06% by weight of $H_3PO_4$ calculated as $P_2O_5$ with respect to the starting $CrO_2$.

The products according to this invention show a considerable stability with respect to water and oxidizable organic substances, and display, thus, a considerable stability in magnetic recording tapes.

The stability of above said products was determined prevailingly on tape, under particularly severe conditions, according to a method in itself known, which consists in exposing for a few days the magnetic $CrO_2$-based tape in a warm environment having a given relative humidity, and in measuring the decay of the residual and saturation magnetization of the tape caused by such exposure.

SPECIFIC DESCRIPTION OF THE INVENTION

The following examples are given for more clearly evidencing the inventive idea of the invention.

EXAMPLE NO. 1

The starting chromium dioxide is $CrO_2$ modified with 0.27% weight (referred to the $CrO_2$) of lanthanum. Its coercive force amounted to 445 Oersted. The maximum magnetization $B_m$ (measured in a 1000 Oersted field) was 2950 Gauss, while the residual magnetization amounted to 1750 Gauss.

70 g of this chromium dioxide were placed into a cylindrical, 750 ml jar together with 300 g of water into which had been dissolved 9.33 g of heptahydrated zinc sulphate (at 99%). Thereupon there were also introduced 400 g of steatite balls of 12 mm diameter. The jar was then made to revolve for 15 hours at a speed of 30 r.p.m., by placing it between two revolving rollers. At the end of the grinding, the mean particle size of the agglomerates of $CrO_2$ particles was less than 40μ. The steatite balls were then separated from the $CrO_2$ suspension by gathering them on a screen and they were washed with 750 g of water. The washing water was added to the suspension whose concentration in $CrO_2$ dropped to 66 g/lt of suspension.

2,120 ml of this suspension were thereupon introduced into a 5000 ml beaker and subjected for 15 minutes to stirring with a mechanical 4-blade stirrer revolving at 200 rpm. In 10 minutes there were admixed 15.5 g of $Na_2HPO_4.12H_2O$ (99%) dissolved in 150 ml of water. There were then added, in about 15 minutes, 22.2 ml of a NaOH solution at 113 g/lt, thereby attaining a final pH of 7.

The suspension was then filtered in a Buchner funnel after which it was washed abundantly with water. The resulting cake was subjected to air suction for about 30 minutes after which it was subdivided into 3 equal portions of 74 g each. Each portion was then additioned with 50 ml of a solution of $H_3PO_4$ at 98.2 g/lt and then stirred for 15 minutes by means of a blade stirrer.

The first portion was treated at 250° C. in an air current for 3 hours. The sinterized mass thus obtained at the end of the treatment was ground in a mortar until reducing it to a fine powder.

The stabilized product thus obtained, contained 14.04% by weight (calculated on the $CrO_2$) of $P_2O_5.0.667ZnO$. 0.47 $H_2O$. Its coercive force (445 Oersted) remained unchanged. Its maximum magnetization $B_m$ dropped to 2650 Gauss, while the residual magnetization $B_r$ dropped to 1550 Gauss; this drop does not mean that there occurred an alteration of the product, but it depends solely on the fact that the measurement is carried out on a powder that no more consists of pure $CrO_2$ but consists of $CrO_2$ and zinc polyphosphate. In fact, the values $B_m$ and $B_r$ are proportional to the percentual quantity of $CrO_2$ present in the sample, wherefore the drop of $B_m$ and $B_r$ gives also an indication on the percentual quantity of coating.

On the contrary, the dropping of $B_r$ and $B_m$ in the magnetic tape, as a function of the time, depends only on the decomposition of the $CrO_2$ and is substantially proportional to the latter.

For the preparation of the magnetic tape one proceeds as follows:

5 g of stabilized chromium dioxide were additioned with 15 g of a $CrO_2$-based varnish formulation consisting of:

| | |
|---|---|
| polymeric compounds (saturated polyurethane plus acetate and vinyl chloride copolymer | 18% b.w. |
| methylethylketone | 40% b.w. |
| tetrahydrofurane | 20% b.w. |
| dimethylacetamide | 20% b.w. |
| anionic surfactant | 2% b.w. |

To this were added 15 g of tetrahydrofurane and the whole mixture was introduced into a 100 ml glass container together with 45 g of small glass spheres of 5 mm $\phi$. The container was then placed on a vibratory disperser which subjected it to a vigorous stirring for just 1 hour.

Thereafter there were added 10 g of the above formulation and 5 grams of tetrahydrofurane, keeping on stirring for another 5 minutes. The homogeneous varnish thus obtained was spread on a flexible polyethylenterephtalate support by means of a film spreader suitable to produce a thickness of 8 mils (203.2 $\mu$). On this spread, allowed to dry for 24 hours, were then measured $B_m$ and $B_r$ by means of an alternate current hysterisigraph, with a magnetizing field of 1000 Oersted.

The tape was then exposed for 6 days at 65° C. in an environment having a relative humidity of 50%. $B_m$ and $B_r$ were then again measured and there was calculated the percentual decrease of said values following the above mentioned exposure. The drop of $B_m$ and $B_r$ turned out to correspond to 19.07%.

With an identical tape, prepared according to the same procedures and starting from 5 g of the same unstabilized $CrO_2$ and contemporaneously subjected to the same stability test, the drop of $B_m$ and $B_r$ proved equal to 36.37%.

EXAMPLES NOS. 2-3

Here it was exactly proceeded as in example 1, except that the thermal treatment was carried out at 100° and 185° C. The product treated at 100° C. contained 16.5% b.w., referred to the $CrO_2$, of $P_2O_5.0.667ZnO.2.47H_2O$ and showed a $B_m$ of 2550 gauss and a $B_r$ of 1500 gauss, while its $H_{ci}$ remained unchanged.

After the test of the exposure to the warm and humid air described in example 1, there was observed a drop of $B_r$ and $B_m$ of 28.27% against 36.37% for the unstabilized product.

The product treated at 185° C. contained 14.67% of $P_2O_5.0.667ZnO$. 0.97$H_2O$ and showed a $B_m$ of 2600 gauss and a $B_5$ of 1550 gauss, while its $H_{ci}$ remainded unvaried. After exposure to warm and humid air, there was observed a drop of $B_r$ and $B_m$ of 19.14% against 36.37% for the unstabilized product.

EXAMPLE NO. 4

The starting chromium dioxide in this test was $CrO_2$ modified with 0.08% by weight of tellurium. Its coercive force amounted to 500 Oersted, while its maximum magnetization $B_m$ (still measured in a field of 1000 Oersted) amounted to 2950 gauss. The residual magnetization $B_r$ amounted to 1750 gauss. 250 grams of this chromium dioxide and 950 g of water were placed into a 3 litre aluminum vessel together with 1000 g of glass spheres of 2.5 mm diameter. The container was then subjected to stirring for 90 minutes on a vibratory disperser.

At the end of the grinding, the particle size of the agglomerates was about 10 $\mu$. This suspension was placed into a glass vessel provided with a blade stirrer, together with the washing water of the glass spheres, wherefore the concentration of the suspension amounted to around 250 g of $CrO_2$ per liter of suspension. Under stirring, the suspension was additioned with 16.5 g of $ZnSO_4.7H_2O$ in the solid state, 13.7 g of $Na_2HPO_4.12H_2O$ (99%) dissolved in 300 ml of water and a solution of NaOH at 113 g/lt up to a pH of 7.

The product was then filtered and washed, then left under air suction and finally treated in an aluminum container with 28.66 g of 85% by weight phosphoric acid dissolved in 150 ml of water, thereby attaining a molar ratio $PO_4=/Zn^{++}$ of 5. The vessel was subjected to stirring for 60 minutes on a vibratory disperser.

The product was then dried at 95° C., under vacuum, and ground in an impact stud mill with counter-rotating stud disks. Thereupon, it was treated for 5 hours at 350° C. The product contained 10.84% by weight of $P_2O_5.0,400ZnO.0,89H_2O$ with respect to the $CrO_2$. Its $B_m$ amounted to 2630 gauss while its $B_r$ amounted to 1560 gauss and its $H_{ci}$ to 500 Oersted.

The stability test on the tape was carried out according to the procedures described in example 1, except for the duration which in this case was 4 days. After the test, the product showed a drop of $B_m$ and $B_r$ in the tape of 14.5% against 36.0% for the unstabilized product.

EXAMPLES NOS. 5-7

In test 5, 70 g of the same $CrO_2$ of example 1 were wet ground according to the same procedures as those of example 1, adding thereto zinc sulphate in such a quantity as to get a ponderal ratio $Zn^{++}/CrO_2$ of 2.24:100.

To the suspension containing 66 g of $CrO_2$/liter of slurry, there were added 200 ml of $H_2O$ containing 5.79 g of $Na_2HPO_4.12H_2O$ (99%); the pH of the slurry was then brought up in 15 minutes to a value of 5,5 by means of a solution of NaOH at 113 g/liter. The product was then filtered, the cake washed and then subjected to suction, still according to the procedures of example 1.

Thereupon the product was stirred for about 15 minutes with 71 ml of a solution of $H_3PO_4$ at 77.22 g/lt. The whole was then dried at 185° C. for about 5 hours and then it was ground. The product thus obtained contained 10.95% (still by weight with respect to the $CrO_2$) of $P_2O_5.0.667ZnO.0.97H_2O$. Its $B_m$ amounted to 2640 gauss while its $B_r$ amounted to 1570 gauss and its $H_{ci}$ to 450 Oersted.

After the stability test on the tape, as described in example 1, the product showed a loss in $B_m$ and $B_r$ in the tape of 22.4%. The unstabilized one, contemporaneously subjected to the same stability test, showed a loss of $B_m$ and $B_r$ in the tape of 36.41%.

In test 6 it was proceeded as in example 5, except that there was added zinc sulphate in such a quantity as to get a ponderal ratio $Zn^{++}/CrO_2$ equal to 1.45:100. To the mixture were then added 3.75 g of $Na_2HPO_4.12H_2O$ (99%) and in the successive stage 86.3 ml of a solution of $H_3PO_4$ at 77.22 g/lt.

The product was also treated for 5 hours at 185° C. The product thus obtained contained 11.48% of $P_2O_5.0,400ZnO. .1,82H_2O$. Its $B_m$ amounted to 2580 gauss, its $B_r$ equalled 1530 gauss, while its $H_{ci}$ amounted to 450 Oersted. After the stability test on the tape, the product showed a drop of $B_m$ and $B_r$ in the tape of 21.65% against 36.41% for the unstabilized product.

In test 7 it was proceeded as in example 5, except that there was added to the mixture zinc sulphate in a ponderal ratio $Zn^{++}/CrO_2$ of 1.07:100.

There were then added 2.78 g of $Na_2HPO_4.12H_2O$ (99%) and, in the successive stage, 92.5 ml of a solution of $H_3PO_4$ at 77.22 g/lt. The treatment was likewise carried out at 185° C. for 5 hours. The product thus obtained contained 11.40% of $P_2O_5.0.286ZnO.2.03-H_2O$. Its $B_m$ amounted to 2570 gauss, its $B_r$ to 1520 gauss while its $H_{ci}$ to 455 Oersted.

After the stability test on the tape, the product showed a drop of $B_m$ and $B_r$ in the tape, of 23.02% against 36.41% for the unstabilized product.

EXAMPLE NO. 8

In this test it was proceeded as in test 6, except that $Zn(OH)_2$ was precipitated in the 1st stage, instead of $Zn_2(PO_4)_3$. The zinc hydroxide was precipitated with a solution of NaOH at 113 g/lt until reaching a pH of 6,5. In the second stage the quantity of solution of $H_3PO_4$ was increased to 98.51 ml so as to reach the same $Zn^{++}/PO_4^{--}$ ratio as that of test 6. Also the thermal treatment was identical. The product contained 11.48% by weight of $P_2O_5.0,400ZnO.1.82H_2O$. The $B_m$ of the product amounted to 2580 gauss, the $B_r$ to 1530 gauss and the $H_{ci}$ to 450 Oersted. After the stability test on the tape, the product showed a drop of $B_m$ and $B_r$ in the tape of 23.5% against 36.41% of the unstabilized product.

EXAMPLE NO. 9

The starting chromium dioxide was $CrO_2$ modified with 0.54% b.w. (referred to the $CrO_2$) of antimony. Its $H_{ci}$ amounted to 495 Oersted, its $B_m$ to 2480 gauss and its $B_r$ to 1745 gauss. On 1 kg. of such a product there was repeated the same treatment as that of example 6, with the only difference that the mixing together of zinc phosphate with phosphoric acid was carried on for 1 hour. Also the thermal treatment was identical with that of example 6. The product contained 11.48% of $P_2O_5.0,400ZnO.1,82H_2O$. Its $B_m$ amounted to 1630 gauss, its $B_r$ to 1650 gauss, while its $H_{ci}$ amounted to 480 Oersted.

After the usual stability test on the tape, the product showed a drop in $B_m$ and $B_r$ in the tape of 15.77% against the 36.5% measured for the unstabilized product. The better stability obtained in comparison with that of example 6, depends mostly on the fact that the starting $CrO_2$ has a finder granulometry.

EXAMPLE NOS. 10-11

In test 10, 250 g of the same $CrO_2$ of example 1 and 950 g of water were placed in a cylindrical, 3 liter jar together with 1000 grams of small glass balls of 2.5 mm diameter.

The jar was then subjected to stirring for 90 minutes in a vibratory disperser. At the end of this grinding, the particle size of the agglomerates was about $10\mu$.

This suspension was placed into a glass vessel fitted with a blade stirrer, together with the washing water of the small glass balls, wherefore the concentration of the suspension amounted to about 250 g of $CrO_2$/liter of suspension. Under stirring, there were then added 16.5 g of $ZnSO_4.7H_2O$ in the solid state, 13.7 g of $Na_2HPO_4.12H_2O$ (99%) dissolved in 300 ml of water and a solution of NaOH at 113 g/lt until reaching a pH of 7.

The product was then filtered and washed, then subjected to the aspiration of air and then put in a glass container fitted with a blade stirrer, and thereafter treated for 1 hour with 41.86 g of an 85% b.w. phosphoric acid dissolved in 150 ml of water, thereby attaining a molar ratio $PO_4^{---}/Zn^{++}$ of 7.

The product was then dried under vacuum at 95° C. and ground in an impact stud mill. Thereafter the product was treated for 5 hours at 350° C.

This product contained 13.38% b.w. of $P_2O_5.0.286-ZnO. .0,53H_2O$ referred to $CrO_2$. Its $B_m$ amounted to 2700 gauss, its $B_r$ to 1580 gauss, while its $H_{ci}$ amounted to 450 Oersted.

After the stability test on the tape, carried out as in example 1, the product showed a drop of $B_m$ and $B_r$ in the tape of 21.0% against the 36.6% of the same but unstabilized product.

In test 11 one operated exactly as had been operated in test 10, except that there was used a $PO_4^{---}/Zn^{++}$ molar ratio of 3. The product obtained, contained 6.51% of anhydrous $P_2O_5.0,667ZnO$.

Its Bm amounted to 2770 gauss, its $B_r$ to 1620 gauss, while its $H_{ci}$ was equal to 445 Oersted. After the stability test on the tape, the product showed a drop of $B_m$ and $B_r$ of 23.0% against the 36.6% for the same but unstabilized product.

EXAMPLE NO. 12

Examples 12-17 refer to $CrO_2$ stabilized with aluminum polyphosphate.

The starting chromium dioxide is a $CrO_2$ modified with 0.27% of lanthanum. Its coercive force $H_{ci}$ amounted to 445 Oersted, while its maximum magnetization $B_m$ (measured in a field of 1000 Oersted) amounted to 2850 gauss, and its residual magnetization $B_r$ was equal to 1700 gaus. 250 g of this $CrO_2$ were placed into a 4 lt container together with 2250 g of small glass balls of 2.5 mm diameter, and with 1000 cc of water. The container was thereupon subjected to stirring for 45 minutes on a vibratory disperser. After removal of the glass balls, the slurry was placed into a 10 liter vessel provided with a blade stirrer. Into this vessel was then added water in such a quantity as to bring the concentration of the slurry to 30 g of $CrO_2$ per liter, and to it were then added 13.90 g of $Al(NO_3)_3.9H_2O$. Thereupon the pH was brought up to 8.5 by means of a NaOH solution of 50 g/lt. This mixture was filtered and washed.

The resulting cake was put into a 4 liter vessel together with 1500 g of small glass balls, 600 g of water and 17.10 g of an 85% $H_3PO_4$. The vessel was thereupon subjected to stirring for 30 minutes on a vibratory disperser.

The slurry was then dried at 90° C. for 12 hours under vacuum and the dry product was ground in an impact stud mill. The dry product was then calcined for 10 hours at 350° C. The product obtained contained 5.50% b.w. of $P_2O_5.0,250\ Al_2O_3 1,09H_2O$ with respect to the $CrO_2$, and showed the following megnatical properties. $H_{ci}$:445 Oersted; $B_m = 2700$ gauss; $B_r = 1600$ gauss. The stability test on the tape was carried out according to the procedures of example 1, except that its duration is of 4 days. After the test there was remarked a drop of $B_m$ of 18% against the 36% observed for the same unstabilized product.

EXAMPLES NOS. 13–14

The procedure was exactly the same way as in ex. 12, except that the quantity of $Al(NO_3)_3.9H_2O$ and $H_3PO_4$ were respectively doubled (test 13) and triplicated (test 14) with respect to example 12.

Product 13 contained 11.00% of $P_2O_5.0,250\ Al_2O_3.1,09H_2O$ (always with respect to the $CrO_2$) and it showed the following magnetic properties: $H_{ci}=450$ Oersted; $B_m = 2540$ gauss; $B_r = 1520$ gauss.

After the stability test (likewise carried out for 4 days), the drop of $B_m$ amounted to 14% against the 36% for the unstabilized product.

Product 14 contained 16.50% of $P_2O_5.0,250Al_2O_3.1,09H_2O$ and showed the following magnetical properties: $H_{ci}=440$ Oersted; $B_m=2400$ gauss; $B_r=1450$ gauss. After the usual stability test, for $B_m$ there was observed a drop of 19% against the 36% observed for the unstabilized product.

EXAMPLE NO. 15

The procedure was the same as in example 12, except that in the second stage there was used only 12.82 g of $H_3PO_4$ at 85% concentration, in order to obtain a ratio $P_2O_5/Al_2O_3$ equal to 3, and that the product, treated with $H_3PO_4$, was then dried for 24 hours at 90° C.

The product thus obtained contained 3.94% of $P_2O_5..0,333Al_2O_3$ free of water, and it showed the following magnetical properties: $H_{ci}=445$ Oersted; $B_m = 2740$ gauss and $B_r = 1650$ gauss.

After the stability test (carried out likewise for 4 days) the drop of $B_m$ was 19% against 36% for the unstabilized product.

EXAMPLE NOS. 16–17

The procedure was the same as in example 15, except that the quantity of $Al(NO_3)_3.9H_2O$ and $H_3PO_4$ were respectively doubled and triplicated with respect to example 15. The product 16 contained 7.89% of $P_2O_5.0,333\ Al_2O_3$ free of water and showed the following magnetical properties: $H_{ci}$:435 Oersted, $B_m$ 2600 gauss; Br: 1550 gauss. After the usual stability test, the drop of $B_m$ was 17% against 36% of the unstabilized product. The product 17 contained 11.83% of $P_2O_5.0,333Al_2O_3$ free of water and showed the following magnetic properties: $H_{ci}=445$ Oersted; $B_m=2530$ gauss and $B_r=1520$ gauss. After the usual stability test, the drop of $B_m$ was 17% against 36% of the unstabilized product.

EXAMPLE NO. 18

Examples 18–27 are referred to $CrO_2$ stabilized with chromium polyphosphate. The starting chromium dioxide was the same as that of example 12.

250 g of $CrO_2$ were placed into a 4 liter container together with 2250 g of small glass balls of 2.5 mm diam. and with 1000 cc of water. The container was thereupon subjected to stirring for 45 minutes on a vibratory disperser. After removal of the small glass balls, the slurry was placed into a 10 liter vessel provided with a blade stirrer. There was then added to it water until reaching a concentration of the slurry corresponding to 30 g $CrO_2$/liter, and to this were added 2.40 g of $CrO_3$ and 2.76 g of $H_3PO_4$ at 85% concentration. The mixture was then heated up to 70° C. and then, under stirring, there were slowly added 5.80 g of $Na_2S_2O_5$ at 95% concentr. dissolved in 250 cc of $H_2O$, maintaining the temperature at 70° C. At the end of the reduction reaction and of the precipitation of the chromium phosphate, the product was filtered and washed.

The cake was then placed into a 4 liter container together with 1500 g of small glass balls, 600 g of water and 11.07 g of 85% $H_3PO_4$. The container was then subjected to stirring for 30 minutes on a vibratory disperser.

The slurry was then dried for 12 hours at 90° C., under vacuum and the dry product was then ground in an impact stud mill. Finally, the product was calcined at 350° C. for 10 hours.

The product thus obtained, contained 4.49% b.w. (with respect to the $CrO_2$) of $P_2O_5.0,200Cr_2O_3.0.98H_2O$ and had the following megnetical properties: $H_{ci}=455$ Oersted; $B_m = 2720$ gauss and $B_r = 1600$ gauss.

The stability test on the tape was carried out according to the procedures of example 1, except that its duration was 4 days. After the stability test there was observed a drop of $B_m$ of 24% against 36% observed for an identical but unstabilized product.

EXAMPLES NOS. 19–27

It was proceeded as in example 18, using different $P_2O_5$ to $Cr_2O_3$ ratios and by operating in such a way as to obtain different quantities of coating on the $CrO_2$ particles. The results obtained have been recorded on Table I.

TABLE I

| Number of test | Quantity of coating (% b.w. with respect to $CrO_2$) | Coating formula | Magnetical properties of Stabilized product. | | | %al drop of $B_m$ after stability test |
|---|---|---|---|---|---|---|
| | | | $H_{ci}$ (Oersted) | $B_m$ (gauss) | $B_r$ (gauss) | |
| 19 | 8.98 | $P_2O_5 . 0,200Cr_2O_3 . 0,98H_2O$ | 440 | 2600 | 1550 | 22 |
| 20 | 13.47 | " | 450 | 2450 | 1470 | 24 |
| 21 | 3.63 | $P_2O_5 . 0,250Cr_2O_3 . 0,53H_2O$ | 440 | 2750 | 1640 | 25 |
| 22 | 7.27 | " | 445 | 2650 | 1580 | 22 |
| 23 | 10.90 | " | 440 | 2540 | 1510 | 23 |

TABLE I-continued

| Number of test | Quantity of coating (% b.w. with respect to CrO₂) | Coating formula | Magnetical properties of Stabilized product. | | | %al drop of $B_m$ after stability test |
|---|---|---|---|---|---|---|
| | | | $H_{ci}$ (Oersted) | $B_m$ (gauss) | $B_r$ (gauss) | |
| 24 | 2.80 | $P_2O_50,333Cr_2O_3 . 0,002H_2O$ | 445 | 2780 | 1630 | 27 |
| 25 | 5.60 | " | 450 | 2700 | 1600 | 24 |
| 26 | 8.39 | " | 455 | 2650 | 1560 | 26 |
| 27 | 12.74 | $P_2O_5 . 0,143Cr_2O_3 . 1,43H_2O$ | 440 | 2490 | 1480 | 27 |

EXAMPLES NOS. 28–30

These examples refer to $CrO_2$ stabilized with aluminum polyphosphate.

It was proceeded as in example 12, using different $P_2O_5/Al_2O_3$ ratios and by operating in such a way as to obtain different quantities of coating on the $CrO_2$ particles.

In test 30, the product was calcined at 300° C. instead of at 350° C.

The results obtained have been recorded on Table II.

TABLE II

| No. of TEST | Quantity of coating (in % b.w. with respect to $CrO_2$) | Formula of the coating | Magnetical properties of stabilized product | | Percentual drop of $B_m$ after stability test |
|---|---|---|---|---|---|
| | | | $B_m$ (in gauss) | $B_r$ (in gauss) | |
| 28 | 5.72 | $P_2O_5 . 0,500Al_2O_3$, anhydrous | 2695 | 1610 | 25 |
| 29 | 12.62 | $P_2O_5 . 0.225Al_2O_3 . 1,38H_2O$ | 2490 | 1455 | 29.5 |
| 30 | 8.00 | $P_2O_5 . 0,333Al_2O_3 . 0,15H_2O$ | 2620 | 1570 | 19 |

EXAMPLE No. 31

This example represents a comparative test carried out with $CrO_2$ coated with $SiO_2$, according to a process of the prior art.

100 g of the same $CrO_2$ of example 1 were ground in an impact stud mill. At the end of the grinding the mean size of agglomerated particles was comprised between 70–80. This ground product was then washed with water and then dispersed in 1000 cc of water in a 2000 cc beaker in which it was subjected to mechanical stirring with a blade stirrer.

To this dispersion there was added in 10 minutes 40 cc of a $H_2SiF_6$ solution having a content in $SiO_2$ of 50 g/lt, and simultaneously a solution of NaOH-2N in such a quantity as to maintain the pH comprised between 2.5 and 3. It was carried on with the addition of NaOH solution until reaching, after 1 hour, a pH of 8. The obtained product was filtered, abundantly washed and then dried for 24 hrs. at 110° C., thereby obtaining a coating of 2% $SiO_2$ calculated on the $CrO_2$.

After exposure to warm and humid air, according to the test of example 1, there was ascertained a drop of $B_r$ and $B_m$ equal to 31.6% in the tape, while the drop amounts to 34% for a tape prepared with a sample of unstabilized $CrO_2$.

We claim:

1. Stabilized ferromagnetic chromium dioxide particles coated with a stabilizing substance which has been formed in situ on the chromium dioxide particles, said stabilizing substance being present in an amount of from 1 to 25% by weight with respect to the chromium dioxide and selected from the group consisting of polyphosphates of zinc, aluminum or chromium (III) having a high molar ratio of phosphorus/metal and having, depending on the metal, the following formula:

$$P_2O_5.nZnO.mH_2O \quad (1)$$

wherein n is between 0.286 and 0.667 and m is between 0 and 2.570;

$$P_2O_5.nAl_2O_3.mH_2O \quad (2)$$

wherein n is between 0.225 and 0.500 and m is between 0 and 2.68; and $$P_2O_5.nCr_2O_3.mH_2O \quad (3)$$

wherein n is between 0.143 and 0.333 and m is between 0.002 and 2.46.

2. Stabilized chromium dioxide particles according to claim 1, characterized in that in the case of the zinc polyphosphate, n is between 0.286 and 0.500, and m is between 0.005 and 0.865.

3. Stabilized chromium dioxide particles according to claim 1, characterized in that in the case of the aluminum polyphosphate, n is between 0.250 and 0.333, and m is between 0 and 1.45.

4. Stabilized chromium dioxide particles according to claim 1, characterized in that in the case of chromium polyphosphate, n is between 0.200 and 0.250, and m is between 0.53 and 1.16.

5. Stabilized chromium dioxide particles according to claim 1, characterized in that these contain from 8% to 16% of zinc polyphosphate, from 4% to 16% of aluminum polyphosphate or from 3% to 14% of chromium polyphosphate.

6. A process for preparing stabilized ferromagnetic chromium dioxide particles coated with a polyphosphate stabilizing agent according to claim 1, the process comprising:

(a) providing a dispersion of chromium dioxide particles in water and adding thereto an alkaline orthophosphate and a salt selected from among water soluble salts of zinc, chromium and aluminum;

(b) adding a base selected from among ammonia and alkaline hydroxides in an amount sufficient to adjust the pH of said dispersion to between 5 and 7 in the case of zinc, between 7.5 and 8.5 in the case of aluminum and between 7 and 8 in the case of chromium, to precipitate the corresponding zinc-, aluminum- or chromium orthophosphate onto the chromium dioxide particles;

(c) separating the orthophosphate-coated chromium dioxide particles from the water and contacting them with $H_3PO_4$ in an amount sufficient to obtain a metal oxide: $P_2O_5$ ratio, depending on the metal, as follows:

between 0.286 and 0.667 for $ZnO:P_2O_5$
between 0.225 and 0.500 for $Al_2O_3:P_2O_5$
between 0.143 and 0.333 for $Cr_2O_3:P_2O_5$; and (d) thermally treating the product from step (c) at an elevated temperature between 100° and 350° C. in the case when zinc orthophosphate is the starting material, and between 275° and 350° C. when aluminum orthophosphate or chromium orthophosphate is the starting material, to obtain the desired polyphosphate-coated, stabilized, particulate ferromagnetic chromium dioxide.

7. A process according to claim 7 wherein said zinc polyphosphate stabilizing agent has the formula $$P_2O_5 \cdot nZnO \cdot mH_2O$$

in which n is between 0.286 and 0.500 and m is between 0.005 and 0.865, the molar ratio $ZnO/P_2O_5$ is between 0.286 and 0.500, and the thermal treatment step (d) is conducted at temperatures between 300° and 350° C.

8. A process according to claim 6 wherein said aluminum polyphosphate stabilizing agent has the formula $$P_2O_5 \cdot nAl_2O_3 \cdot mH_2O$$

in which n is between 0.250 and 0.333 and m is between 0 and 1.45, the molar ratio $Al_2O_3/P_2O_5$ is between 0.250 and 0.333, and the thermal treatment step (d) is conducted at temperatures between 300° and 350° C.

9. A process according to claim 6 wherein said chromium polyphosphate stabilizing agent has the formula $$P_2O_5 \cdot nCr_2O_3 \cdot mH_2O$$

in which n is between 0.200 and 0.250 and m is between 0.53 and 1.16, the molar ratio $Cr_2O_3/P_2O_5$ is between 0.200 and 0.250, and the thermal treatment step (d) is conducted at temperatures between 300° and 350° C.

10. A process according to claim 6 wherein heating step (d) is conducted at a temperature between 180° and 350° C. when a zinc salt is the starting material and at a temperature between 300° and 350° C. when an aluminum salt or a chromium salt is the starting material.

11. A process according to claim 10 wherein heating step (d) is conducted at a temperature between 300° and 350° C. when a zinc salt is the starting material.

12. A process for preparing stabilized ferromagnetic chromium dioxide particles coated with a polyphosphate stabilizing agent according to claim 1, the process comprising:

(a) providing a dispersion of chromium dioxide particles in water and adding thereto a salt selected from among water soluble salts of zinc, chromium and aluminum;

(b) adding a base selected from among ammonia and alkaline hydroxides in an amount sufficient to adjust the pH of said dispersion to between 5 and 7 in the case of zinc, between 8 and 9 in the case of aluminum and between 6 and 7 in the case of chromium, to precipitate the corresponding zinc-, aluminum- or chromium hydroxide onto the chromium dioxide particles;

(c) separating the hydroxide-coated chromium dioxide particles from the water and contacting them with $H_3PO_4$ in an amount sufficient to obtain a metal oxide: $P_2O_5$ ratio, depending on the metal, as follows:

between 0.286 and 0.667 for $ZnO:P_2O_5$
between 0.225 and 0.500 for $Al_2O_3:P_2O_5$
between 0.143 and 0.333 for $Cr_2O_3:P_2O_5$; and (d) thermally treating the product from step (c) at an elevated temperature between 100° and 350° C. when a zinc salt is the starting material, and between 275° and 350° C. when an aluminum salt or a chromium salt is the starting material, to obtain the desired polyphosphate-coated, stabilized, particulate ferromagnetic chromium dioxide.

13. A process for preparing stabilized ferromagnetic chromium dioxide particles coated with a chromium polyphosphate stabilizing agent according to claim 1, the process comprising:

(a) providing a dispersion of chromium dioxide particles in water and adding thereto chromium trioxide;

(b) reducing said chromium trioxide in the presence of $H_3PO_4$ to chromium (III) orthophosphate and precipitating said orthophosphate onto the chromium dioxide particles;

(c) separating the chromium orthophosphate-coated chromium dioxide particles from the water and contacting them with $H_3PO_4$ in an amount sufficient to obtain a molar ratio between the $Cr_2O_3$ and the $P_2O_5$ of between 0.143 and 0.333; and (d) thermally treating the product from step (c) at an elevated temperature between 275° and 350° C. to obtain the desired chromium polyphosphate-coated, stabilized, particulate ferromagnetic chromium dioxide.

14. A process according to claim 13 wherein said chromium polyphosphate stabilizing agent has the formula:

$$P_2O_5 \cdot nCr_2O_3 \cdot mH_2O$$

wherein n is between 0.200 and 0.250, m is between 0.53 and 1.16, the molar ratio of $Cr_2O_3$ to $P_2O_5$ is between 0.200 and 0.250, and thermal treatment step (d) is conducted at a temperature between 300° and 350° C.

* * * * *